Figure 1:
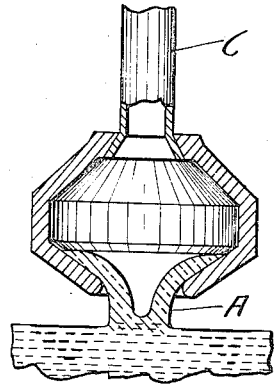

UNITED STATES PATENT OFFICE.

ARTHUR E. SPINASSE, OF MOUNT VERNON, OHIO, ASSIGNOR TO PITTSBURGH PLATE GLASS COMPANY, OF PITTSBURGH, PENNSYLVANIA, A CORPORATION OF PENNSYLVANIA.

METHOD OF DRAWING GLASS.

1,208,851.  Specification of Letters Patent.  Patented Dec. 19, 1916.

Original application filed August 26, 1911, Serial No. 646,238. Divided and this application filed October 25, 1911. Serial No. 656,784.

*To all whom it may concern:*

Be it known that I, ARTHUR E. SPINASSE, a citizen of the United States, residing at Mount Vernon, in the county of Knox and State of Ohio, have invented certain new and useful Improvements in Methods of Drawing Glass, of which the following is a specification.

My invention relates to a method of drawing glass and this application is in the nature of a companion to my co-pending application, Serial Number 646,238, filed August 26, 1911, upon machines for drawing glass, the essential feature of which is the peculiar structure of bait.

My invention resides in the formation of a glass novel with a bait of a special structure and in such a manner that there will be an assured capability of relative movement of the glass novel upon the bait during the expansive and contractive actions which inevitably result during the drawing operation and which necessarily are the source of the existing great percentage of breakage. The assurance of the capability of the relative movement of the novel upon the working surface of the bait during the drawing operation, is not only dependent upon the structure of the bait, but is dependent upon the comparative temperatures of the glass and the bait. Under the temperatures at which baits are now used, the material of each bait becomes fused with the glass and is pitted thereby throughout. This causes the glass to adhere. In the effectual operation of my improved form of bait, it is necessary that the bait be utilized at such a temperature that there is no fusion or adherence of the glass to the bait. This temperature differs according to the different materials used in the bait and the different temperatures at which the molten glass baits may be maintained. The maintenance of this proper temperature is one of the main features of my method and I desire to reiterate that there is no one definitely constant temperature at which the bait is operative, but the temperature must be such as to insure a flux clinging action of the novel upon the bait. As a matter of fact, the normal fusion temperature between the glass and a bait of Norway iron, is probably in the neighborhood of 800 degrees Fahrenheit, whereas I find that my best results are attained when my bait is below 200 degrees Fahrenheit.

Another main feature of my method, is the necessity for having a definite and ascertained initial formation of the novel upon the bait used by me. If the bait is to be dipped into the molten glass bath, it must not be dipped any farther than will admit of a relative movement of the glass and the bait in the contractive and expansive actions occurring during drawing. If the bait is to secure its novel by a suction action without entering the bath, the operator must carefully guard against forming the novel of such a shape and expanse as will render this relative movement impossible.

A further feature of my method is advantageously used under certain conditions and resides in the regulation of the density of the air at the juncture of the bait and the novel. This regulation is for the purpose of initially forming the glass article so that it will be assured of a capability of relative movement. This regulation of the density of the air may be by increasing or decreasing the volume of the air at this point of juncture and such regulation is, of course, dependent upon the particular form of bait being used. Under general conditions, my form of bait insures relative movement under contraction and expansion, but there are certain circumstances which render it advisable to have a positive means for initially forming the article to insure such relative movement. This positive means desirably takes the form of either an increase or decrease of the normal air pressure at the junction of the bait and the novel.

Being able to use my bait in comparatively cold condition, has one other important function in that it enables me to impart an initial molding action to the glass article being drawn and to thus obviate what is known as the "thick and thin" draw. This molding action is effected by the outer surfaces of the bait, which are desirably non-retentive of the molten glass and which by their contact with the glass bath partially congeal a definite portion of the surface of the bath, which partially congealed portion eventually becomes the initial portion of the glass article. It is a known fact in the art of drawing glass, that the initial formation of the article determines its subsequent form and for this reason the starting of the drawing action with the bait slightly out of true has hitherto produced the fault of the "thick and thin" draw which extended throughout the article being drawn, since it is impossible to correct this initial forming effect. By my improvement, the initial part of the article to be drawn, is partially congealed and practically formed before it leaves the bait. In consequence of this and as a result of these constant tendencies of the glass article in drawing, the whole glass article retains the form and likeness of its initial portion.

By way of illustration of the method utilized by me in drawing glass, the accompanying drawings show various forms of baits which may be used in the application of this method and in these drawings:

Figures 1, 4, 8 and 9 show types of baits which are used under atmospheric pressure. By reference to these figures, it will be observed that the baits are provided with pockets having upwardly diverging working surfaces and having what may be termed a lineal departure point at their orifice. This lineal departure point is of importance, in that it prevents the gripping of the neck of the novel A by a band of metal or other material having a coefficient of expansion different from that of glass. This is effected in this illustration of the method by the use of outwardly curved lips for the orifice of the bait pocket. It will be understood that this bait is moved into a position to secure the novel. As the bait is at a comparatively low temperature, the molten glass in the bath congeals with comparative rapidity upon contacting with the bait and it is retained by the bait because of a lax clinging action occasioned by the angle of the walls of the bait. There is no fusion because the metal of the bait is kept at such a temperature as to obviate danger of this. Further drawing of the article necessarily results in different degrees of expansion and contraction of the glass and the bait. As a result of this difference, a relative movement takes place between the glass and the bait and the novel moves upwardly upon the working surface of the bait. This is only possible by so forming the novel as to length that it will not reach the widest point of the working surface before its upward movement under contraction. Therefore, it is of utmost importance that, if the novel is secured by dipping the bait into the molten glass, it be not dipped too deep. There must be sufficient space left upon the working surface of the bait to afford room for the upward movement of the novel thereon.

The utilization of the bait in a comparatively cold condition has a further effect in that it enables me to provide, not only novel retaining surfaces, but adjacent surfaces of a form to shed the molten glass within which they come in contact when entering the bath and by such provision to produce a formative effect upon the surfaces of the glass immediately adjacent the novel. By this means, I am enabled to insure a comparatively even drawing operation, because such partial congealing of these surfaces renders them of a comparatively even density throughout and causes them to naturally assume a position to form the initial part of the glass article. In the subsequent drawing operation, these partially congealed surfaces comprising this initial formation, determine the form and thickness of the glass article.

Figure 2:
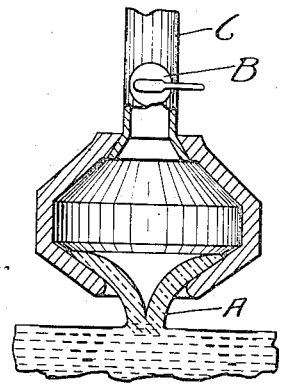
Figure 4:
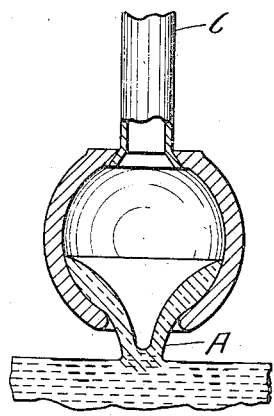
Figure 5:
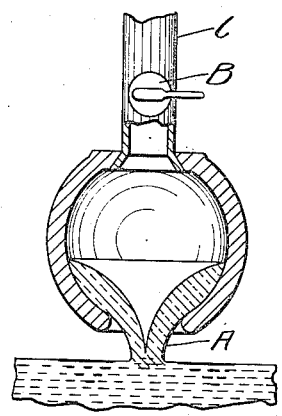

Figures 2 and 5 show drawing elements practically identical with those shown in Figs. 1 and 4, but these drawing elements are provided with valves B which are manipulated in a manner to have a positive effect upon the novels A in drawing. More specifically, the bait is inserted into the glass bath in this form and the valves B are closed. The upward movement of the bait then has a slight tendency to produce a suction effect upon the novel and by so doing to taper the novel more sharply. With this sharper tapering formation of the novel, such novel is more certain to have a capability of relative movement within the bait.

Figure 3:
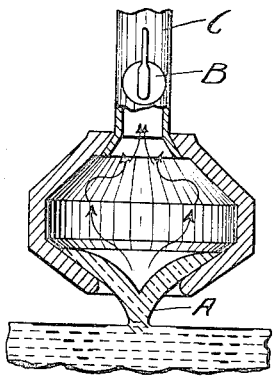
Figure 6:
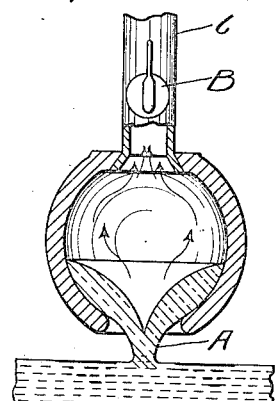

Figures 3 and 6 are substantially identical with the structures shown in Figures 2 and 5 and their action upon the novel A is based substantially upon the same principle, but with a more definite action. The interiors of these baits are under the control of the valves B. In the structure shown in these figures, the valves B are open and a suction device is in connection through the pipes C, that is, has an even greater tendency to increase the taper of the novel.

Figure 7:
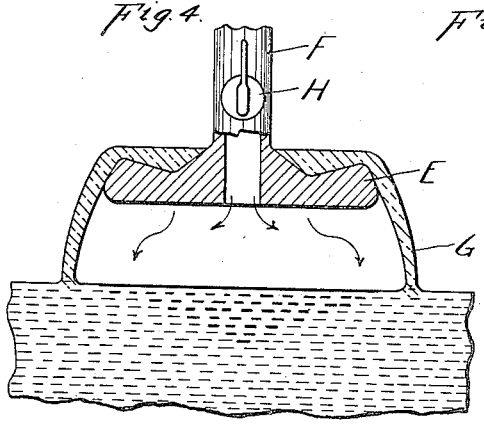
Figure 8:
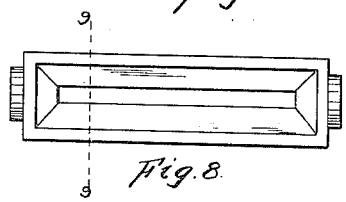
Figure 9:
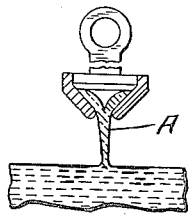

My invention may be readily applied to baits supporting the novel from their exterior surfaces. An example of this is shown in Figure 7, wherein the bait E carried by the pipe F supports the novel G and is under the control of the valve H. In this figure, the valve is shown open and the arrows indicate that air under pressure is being forced through the bait to the point of juncture of the bait and novel.

It may be noted in summary that my improved method in its broad aspect is primarily based upon two steps, that is, procuring a novel supported upon a bait without fusion and insuring such relative formation of the novel and bait that rupturing pressures are avoided throughout the drawing operation. Procuring the novel supported without fusion is preferably effected by using the bait comparatively cold. Insuring proper relative formation of the novel and bait may be effected in many ways and some of these have been outlined. The utilization of this bait in cold condition is made use of to have a formative effect upon the article being drawn. In addition to this, it may under certain conditions be advisable to vary the air pressure at the point of juncture of the bait and the novel and these features all constitute a part of my improved method which is based upon a bait having a capability for relative movement and which contemplates the use of such bait in such a manner that the relative movement of the novel upon the bait will be assured.

What I claim, is—

1. The herein described method of drawing glass cylinders from a body of glass with a metal bait having its bottom open and its interior thereabove of a larger dimension than the opening, which consists in maintaining the bait at a temperature to chill the glass, immersing the bait while at such temperature to such a depth as to permit the glass to flow upward into the enlarged interior where it is chilled by the relatively low temperature of the bait, and then raising the bait supporting the cylinder as it is drawn by the glass within the bait and applying air pressure to its interior, with the glass upon the interior of the bait supported free to shrink radially toward the center of the bait.

2. The herein described method of drawing glass cylinders from a body of glass with a metal bait having its bottom open and its interior thereabove of a larger diameter than the opening, which consists in maintaining the bait during the operation as hereinafter set forth, at a temperature such as to chill the glass contacting therewith and prevent its adherence to the bait, immersing the bait to such a depth as to permit the glass to flow upward into the enlarged interior where it is chilled by the relatively low temperature of the bait, and then raising the bait supporting the cylinder as it is drawn by the glass within the bait and applying air pressure to its interior, with the chilled glass upon the interior of the bait supported non-adherent to the bait and free to move with respect to the surface of the bait upon which it is supported.

3. The herein described method of drawing glass cylinders from a body of glass with a metal bait having its bottom open and its interior thereabove of a larger diameter, which consists in maintaining the bait during the operation as hereinafter set forth, at a temperature such as to chill the glass and prevent adherence to the bait, causing the glass from the said body of glass to flow into the bait where it is chilled by the relatively low temperature of the bait, and then raising the bait supporting the cylinder as it is drawn by the glass within the bait and applying air pressure to its interior, with the chilled glass upon the interior of the bait supported non-adherent to the bait and free to move with respect to the surface of the bait upon which it is supported.

4. The herein described method of drawing glass cylinders from a body of glass with a metal bait provided with a circular supporting ledge, which consists in maintaining the bait during the operation as hereinafter set forth, at a temperature such as to chill the glass and prevent adherence to the bait, causing the glass from the said body of glass to flow over the supporting ledge where it is chilled into an annular flange or ring by the relatively low temperature of the bait, and then raising the bait supporting the cylinder as it is drawn by the annular ring of chilled glass, with the said chilled glass ring supported non-adherent to the bait and free to move radially with respect to the surface of the bait upon which it is supported.

5. The herein described method of drawing glass cylinders from a body of glass with a metal bait having its bottom open and its interior thereabove of a larger dimension than its opening, which consists in maintaining the bait during the operation as hereinafter set forth at a temperature such as to chill the glass contacting therewith and prevent its adherence to the bait, immersing the bait in the body of glass to such a depth as to permit the glass to flow upward into the enlarged interior where it is chilled into a solid flange or ring by the relatively low temperature of the bait, and then raising the bait supporting the cylinder as it is drawn by the chilled glass within the bait and applying air pressure to its interior, with the said chilled flange or ring upon the interior of the bait and the neck of glass extending downwardly therefrom supported non-adherent to the bait and free to shrink radially toward the center of the bait.

In testimony whereof I affix my signature in presence of two witnesses.

ARTHUR E. SPINASSE.

Witnesses:
 WALTER E. L. BOCK,
 E. P. CORBETT.